US012650964B1

(12) United States Patent
Al-eisa

(10) Patent No.: US 12,650,964 B1
(45) Date of Patent: Jun. 9, 2026

(54) DATA COMPRESSION FOR SORT/MERGE PROCESSING

(71) Applicant: BMC Software, Inc., Houston, TX (US)

(72) Inventor: Eisa A. Al-eisa, Katy, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 19/096,271

(22) Filed: Mar. 31, 2025

Related U.S. Application Data

(60) Provisional application No. 63/704,412, filed on Oct. 7, 2024.

(51) Int. Cl.
  *G06F 16/215* (2019.01)
  *G06F 16/22* (2019.01)
(52) U.S. Cl.
  CPC ........ *G06F 16/215* (2019.01); *G06F 16/2282* (2019.01)
(58) Field of Classification Search
  None
  See application file for complete search history.

(56) References Cited

U.S. PATENT DOCUMENTS

| | | | | |
|---|---|---|---|---|
| 5,274,805 A | * | 12/1993 | Ferguson | ................... G06F 7/24 |
| | | | | 708/203 |
| 5,355,478 A | * | 10/1994 | Brady | ........................ G06F 7/24 |
| 2020/0073633 A1 | * | 3/2020 | Jacobi | ........................ G06F 7/02 |

* cited by examiner

*Primary Examiner* — Eddy Cheung
(74) *Attorney, Agent, or Firm* — Brake Hughes Bellermann LLP

(57) ABSTRACT

Described techniques enable compression and decompression of sort keys during sort/merge operations. A winning offset code value may be received from a merge bracket used to merge a plurality of sorted sequences of sort keys by comparing pairs of the sort keys until a winning sort key is determined. The sort keys may be represented by corresponding offset code values determined from relative values of pairs of sort keys, and the winning offset code value represents the winning sort key of the merge bracket. A removed portion of the winning sort key may be determined from the winning offset code value. A reduction value characterizing a size of the removed portion may be determined, and, from the winning offset code value, a retained portion of the winning sort key to retain may be determined. The reduction value and the retained portion of the winning sort key may then be stored.

20 Claims, 6 Drawing Sheets

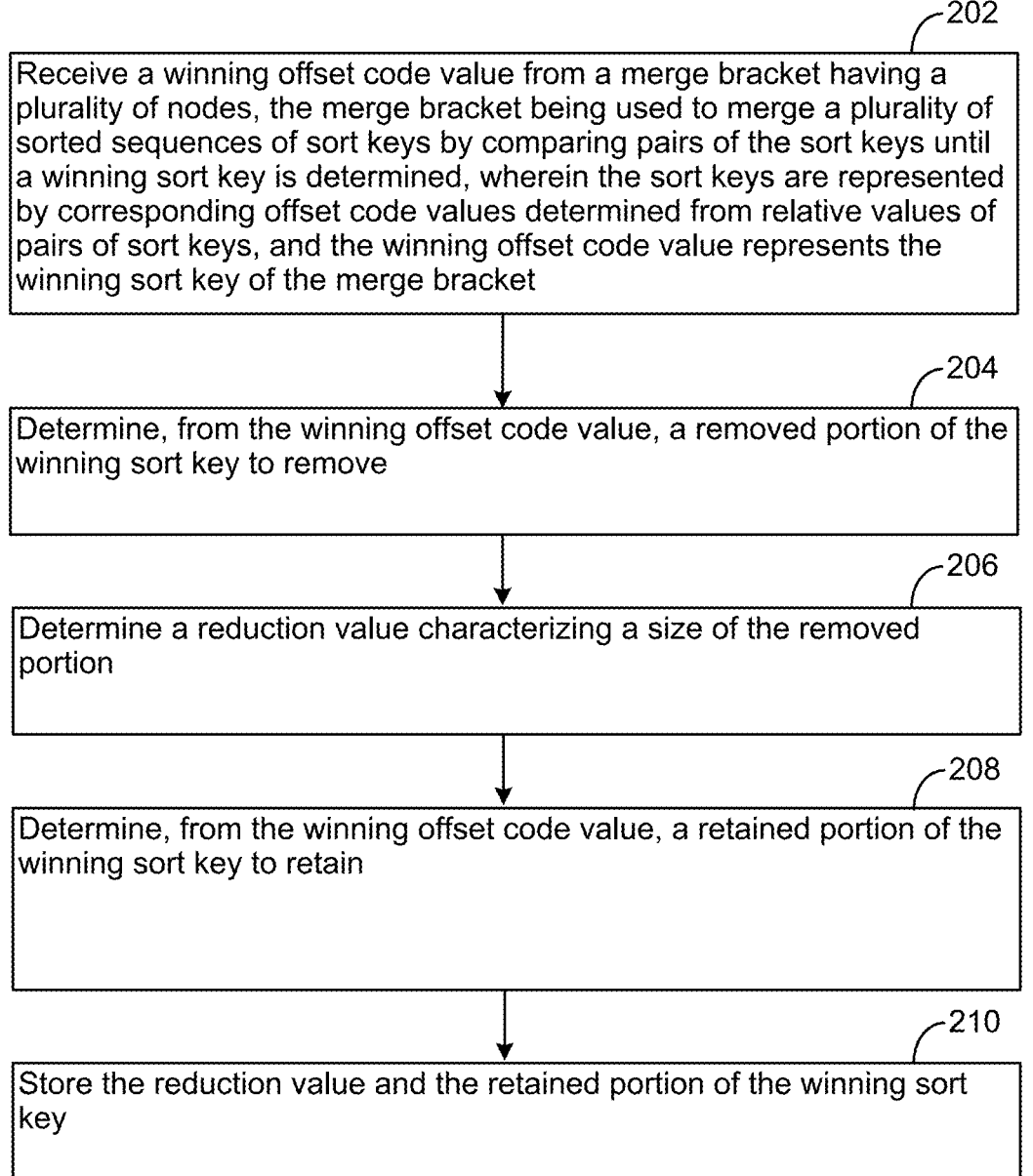

202

Receive a winning offset code value from a merge bracket having a plurality of nodes, the merge bracket being used to merge a plurality of sorted sequences of sort keys by comparing pairs of the sort keys until a winning sort key is determined, wherein the sort keys are represented by corresponding offset code values determined from relative values of pairs of sort keys, and the winning offset code value represents the winning sort key of the merge bracket

204

Determine, from the winning offset code value, a removed portion of the winning sort key to remove

206

Determine a reduction value characterizing a size of the removed portion

208

Determine, from the winning offset code value, a retained portion of the winning sort key to retain

210

Store the reduction value and the retained portion of the winning sort key

FIG. 2

DATA COMPRESSION FOR SORT/MERGE PROCESSING

CROSS-REFERENCE TO RELATED APPLICATION

This application claims benefit, under 35 U.S.C. § 119, of U.S. Provisional Patent Application No. 63/704,412, filed on Oct. 7, 2024, entitled "SORTING AND MERGING WITH DATA COMPRESSION IN DATABASE MANAGE-MENT," the disclosure of which is incorporated by reference herein in its entirety.

TECHNICAL FIELD

This description relates to database management.

BACKGROUND

Database technology enables storage, analysis, and retrieval of vast amounts of data, including data sets of billions of individual data records. For example, database servers, database management systems, and database languages may be used to store records in a structured manner, insert or delete records, and query available records to retrieve desired information.

Data is often sorted to make the data easier to use. For example, data may be sorted to arrange the data in a meaningful order, so that the data is easier to analyze or visualize. In simple examples, numerical data may be sorted in an ascending or descending order. More generally, data may be sorted by any included or assigned order, such as by included text, numbers, dates, or times. Other examples include sorting data by custom lists (e.g., characteristics such as large, medium, small), or by format.

Sorting large quantities of data, however, may be time-consuming and/or resource intensive. For example, data may be sorted using a processor, associated processor caches, and main memory, which are among the most constrained hardware resources within a database management system.

Techniques have been developed to use less constrained resources, such as disk memory, when sorting data. For example, in sort-merge techniques, data to be sorted is divided into sets, and then each set is sorted one set at a time. Then, sorted sets may be merged into a single sorted set. During these operations, disk memory may be used as an intermediate memory to conserve other memory resources.

In such sort-merge techniques, writing data to the disk memory and reading data from the disk memory consume significant quantities of time. It is possible to compress data being written/read, but conventional data compression techniques also require non-trivial time and computing resources.

SUMMARY

According to one general aspect, a computer program product may be tangibly embodied on a non-transitory computer-readable storage medium and may include instructions. When executed by at least one computing device, the instructions may be configured to cause the at least one computing device to receive a winning offset code value from a merge bracket having a plurality of nodes, the merge bracket being used to merge a plurality of sorted sequences of sort keys by comparing pairs of the sort keys until a winning sort key is determined, wherein the sort keys are represented by corresponding offset code values determined from relative values of pairs of sort keys, and the winning offset code value represents the winning sort key of the merge bracket.

When executed by at least one computing device, the instructions may be configured to cause the at least one computing device to determine, from the winning offset code value, a removed portion of the winning sort key to remove, and determine a reduction value characterizing a size of the removed portion. When executed by at least one computing device, the instructions may be configured to cause the at least one computing device to determine, from the winning offset code value, a retained portion of the winning sort key to retain, and store the reduction value and the retained portion of the winning sort key.

According to other general aspects, a computer-implemented method may perform the instructions of the computer program product. According to other general aspects, a system, such as a mainframe system or a distributed server system, may include at least one memory including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompa-nying drawings and the description below. Other features will be apparent from the description and drawings, and from the claims.

BRIEF DESCRIPTION OF THE DRAWINGS

FIG. 2 is a flowchart illustrating example operations of the system of FIG. 1.

DETAILED DESCRIPTION

Figure 1:
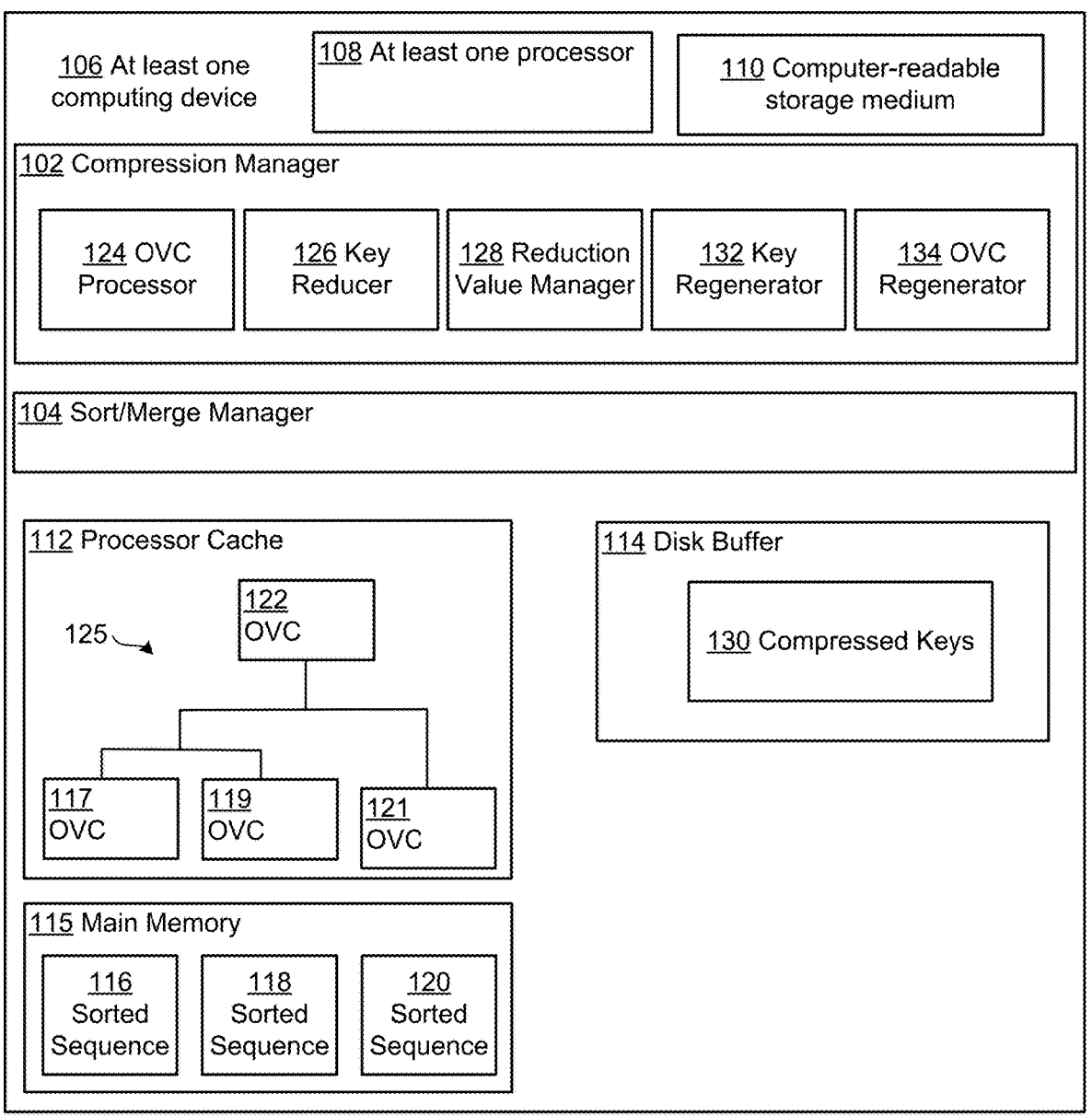
FIG. 1 is a block diagram of a system for data compression for sort/merge processing.

Described systems and techniques enable extremely fast and efficient data compression (and decompression) of data written to (and read from) disk during data sort/merge operations. Accordingly, elapsed time associated with the sort/merge operations may be reduced. As a result, for example, users may experience improved application loading times or other reductions in system downtimes.

Conventional database management systems include techniques and capabilities for sorting and merging data. As referenced above, a significant time-limiting aspect of such sort/merge operations involves the use of disk or other secondary memory as an intermediate data storage location or overflow mechanism for processor caches and/or main memory.

More specifically, sort/merge techniques have been developed and widely used that are capable of optimizing the use of primary memories such as processor caches and main memory. For example, in the very early days of database management, data was sorted using brute force calculations, in which each sort key was considered in turn and compared against remaining sort keys to establish a sorted order.

Subsequently, more optimized sorting algorithms were developed that used a binary tree similar to tournament brackets in sporting events, such as in tennis or basketball. Analogously to such contexts, in such sorting techniques, individual pairs of sort keys are compared, so that 'winners' of each comparison or match will advance to a subsequent round, and eventually a winner of the entire bracket is determined. For example, when sorting in an ascending (descending) order, each match between a pair of sort keys will be won by the lower (higher) sort key, and each bracket instance or round will be won by the lowest (highest) sort key in that bracket instance. Thus, the final sorted/merged list is formed by maintaining the winners of the various rounds in order.

Various optimizations of this tournament bracket approach to sorting have been developed. For example, it is possible to simply store a key at a corresponding node of the tournament bracket, and compare each pair of keys directly. However, sort keys vary in size and are often relatively lengthy, so that storage of keys using the same storage as the nodes of the tournament bracket is generally impractical.

Instead, approaches were developed in which the tournament bracket nodes each store pointers, where each pointer pointed to a corresponding sort key. Although such an approach provided improvements, processing associated with using each pointer to access each corresponding sort key was still lengthy and problematic.

Subsequent approaches were developed that provide a representation of each sort key relative to a single sort key value. For example, the single sort key value may be a zero value, or may be a known lowest value of sort keys to be sorted. Then, the resulting representations of corresponding sort keys, which may be much smaller in size than the sort keys themselves, may be meaningfully compared to one another. Such representations of sort keys may be referred to as offset values, offset code values (OCVs), or codewords.

For example, OCVs may be stored in nodes of the type of tournament bracket or tree discussed above, and within a processor cache. Then, in most cases, pairs of OCVs at each bracket level may be compared to one another within the cache to determine a winning OCV of a tournament bracket instance, representing, e.g., a lowest sort key value within the tournament bracket instance. This process may be repeated until all the sort keys have been sorted in a desired order.

The preceding description provides a high-level summary of sorting techniques. For example, even when using OCVs to compare sort key values, exceptional cases may occur in which it is necessary to access a memory outside of the cache (e.g., a cache miss occurs). Although further examples and descriptions of the use of OCVs are provided below, it will be appreciated that described techniques are not directed to improvements in sorting technologies or algorithms, so that a complete or exhaustive description of such sorting techniques, or the use of OCVs therein, is not provided herein.

Rather, the above background and context of known sorting techniques are provided to facilitate understanding of described compression/decompression techniques used, e.g., to write to, or read from, a secondary memory such as a disk memory, in the context of sort/merge operations. In particular, as described in detail, below, OCVs, or other representations of sort keys used during sorting, are leveraged to provide data compression for sort keys stored in secondary memory. As a result, significant gains in elapsed time of sort/merge operations may be provided, along with a reduction in a quantity of secondary memory needed to perform a given level of sort/merge operations.

For example, described techniques may use OCVs to identify redundancies within sorted key values. Then, identified redundant key data may be eliminated (deleted) prior to storing remaining key data in secondary memory. Consequently, as just referenced, less data is required to be stored in the secondary memory, and less time is required to write the compressed key data. Moreover, the original sorted key data may be reconstructed, i.e., decompression may be provided, in a fast and reliable manner.

By leveraging OCVs or other representations of sort key comparisons, it is not necessary to use conventional compression/decompression techniques, which, as referenced above and as generally known, are associated with significant time losses and consumption of processing resources. Instead, as described in detail below, described techniques provide no cost, or close to no cost, key data compression, to provide the types of significant reductions in elapsed time and reductions in secondary memory usage referenced above.

FIG. 1 is a block diagram of a system for data compression for sort/merge processing. In the example of FIG. 1, a compression manager 102 is configured to support operations of a sort/merge manager 104 in the manner(s) referenced above, including compressing and decompressing sort keys that have been sorted and/or merged by the sort/merge manager 104.

The compression manager 102 and the sort/merge manager 104 are illustrated as being operated through the use of at least one computing device 106, which may represent, e.g., one or more mainframe computer(s). The at least one computing device 106 includes at least one processor 108 and at least one non-transitory computer-readable storage medium 110. The non-transitory computer-readable storage medium 110 may store instructions that, when executed by the at least one processor 108, cause the at least one computing device 106 to provide the functionalities of the compression manager 102 and the sort/merge manager 104.

The computer-readable storage medium 110 may represent one or more types of physical memory used by the at least one computing device 106. For example, the computer-readable storage medium 110 may represent a main memory of the at least one computing device and/or various types of secondary memories that may be available. In FIG. 1, specific types of computer-readable storage media, helpful in understanding operations of the compression manager 102 and the sort/merge manager 104, are illustrated as a processor cache 112, a disk buffer 114, and main memory 115.

Specifically, in the example of FIG. 1, the main memory 115 is illustrated as storing three sorted sequences, shown as sorted sequence 116, sorted sequence 118, and sorted sequence 120. In some implementations, sorted sequences may be stored at least partially in the cache 112. In a highly simplified example, the sorted sequence 116 may include or reference values 1, 5, 10, the sorted sequence 118 may include or reference values 2, 7, 11, and the sorted sequence 120 may include or reference values 8, 12, 13. Thus, the sort/merge manager 104 may be configured to merge the sorted sequences 116, 118, 120 into a single, merged and sorted list of ascending values 1, 2, 5, 7, 8, 10, 11, 12, 13.

To perform related operations, and as referenced above, the processor cache 112 may be used to store a merge bracket 125. As shown, the merge bracket 125 represents a tournament style bracket, e.g., a multi-level binary tree graph in which each internal or parent node is associated with a pair of child nodes, including one layer of internal nodes having external child nodes at which values to be merged are loaded.

Thus, in the specific example of FIG. 1, a node 117 represents an external node of the merge bracket 125 used to load a representation of a first key value of sort keys of the sorted sequence 116. A node 119 represents an external node of the merge bracket 125 used to load a representation of a first key value of sort keys of the sorted sequence 118. A node 121 represents an external node of the merge bracket 125 used to load a representation of a first key value of sort keys of the sorted sequence 120. Then, in tournament fashion, a winning value between the nodes 117, 119 may be compared against a value of the node 121, with the winner of that comparison advancing to a final, winning node 122.

Using the simplified example values above, initial values of the nodes 117, 119, 121 would be 1, 2, and 8, respectively. Therefore, 1 would compare lower than 2, and then would compare lower than 8, and would emerge as the winning value from the merge bracket 125. Then, the next value of 5 would be loaded to the node 117, so that the value 2 at node 119 would advance to be compared against the value 8 at node 121, and would then emerge as the next value to be included in the final merged list. Put another way, a first instance of the merge bracket 125 may output a first winning value (e.g., lowest value), a second instance of the merge bracket 125 may output a second winning value, and so on through multiple instances of the merge bracket 125 until a final sorted, merged list is obtained.

The preceding example is highly simplified for the sake of explanation and illustration, and it will be appreciated that, in practice, a size of the merge bracket 125 may be larger, and more than three sorted sequences may be merged. Moreover, values being merged may be represented as bytes of data, where multiple bytes of data may be required to represent each sort key being merged. For example, sort keys having 15 bytes or more may occur in database applications.

Consequently, it is impractical to store full key values within nodes of the merge bracket 125. That is, the processor cache 112 is typically not large enough to hold such a merge bracket. As noted above, some conventional techniques store pointers in the nodes of the merge bracket 125, where such pointers point to memory locations of corresponding sort key values being merged. Although the pointers may be much smaller than their corresponding sort key values and may fit within the processor cache 112, such approaches are problematic due to the time needed to utilize each pointer to access its corresponding sort key value.

Therefore, the sort/merge manager 104 may utilize representations of sort key values, in which each sort key value is represented by a value that is determined with respect to, or relative to, another value. Such representations may be referred to as offset values, codewords, or, as in the example of FIG. 1, as offset value codes (OVCs). Then, as also shown in FIG. 1, and as the OVCs are much smaller than their corresponding sort key values, the OVCs may be stored and utilized at each node of the merge bracket 125, enabling the merge bracket 125 to be stored in its entirety within the processor cache.

More generally, use of the OVCs reduces the computational cost of key comparisons by encoding a position(s) and value(s) at which keys differ with respect to another key or with respect to a known value (e.g., the value 0). This approach allows for faster, integer-based comparisons rather than full key comparisons. In particular, use of the OVCs enables hardware-assisted sorting and associated instructions. For example, specialized processors or processor elements may be used, such as fast integer units. In additional specific examples, described below, the z/Architecture® from IBM includes at least two relevant hardware instructions: Compare and Form Codeword (CFC), which inputs two values and outputs a codeword, or OVC, and Update Tree (UPT), which updates an instance of the merge bracket 125 to determine a current winning OVC.

Although not shown separately in FIG. 1, each node of the merge bracket 125 may include, in addition to a corresponding OVC, key location information that enables a relating of an OVC to its corresponding sort key value. Thus, for example, upon successful completion of an update of an instance of the merge bracket 125, so that a winning OVC is output from the merge bracket 125, the sort/merge manager 104 may be configured to use key location information associated with the winning OVC to retrieve a corresponding sort key value. For example, the sort/merge manager 104 may use an available index to identify the corresponding sort key value, which may then be compressed by the compression manager 102 for storage using the disk buffer 114, as referenced above and described in more detail, below. In other example operations, a sort key may be recovered from a corresponding OVC.

There are many additional or alternative aspects of the generation and use of the OVCs and associated commands in the context of the merge bracket 125, including techniques for retrieving/identifying corresponding sort key values associated with a winning OVC. For example, some such details relate to techniques for initializing or priming the merge bracket 125, and techniques for flushing the merge bracket 125 as final values of the sort sequences 116, 118, 120 are reached. In other examples, special use cases exist, such as when two different sort key values map to the same OVC value.

Some aspects of these and other details of operations of the sort/merge manager 104 may be discussed in ensuing examples, but, in general, operations of the compression manager 102 may be sufficiently understood with respect to the examples and descriptions of the merge bracket 125, as well as with respect to additional details provided in the context of various examples, below. That is, as described above, the sorted sequences 116, 118, 120 are merged by loading and updating instances of the merge bracket 125, with each instance winner providing a winning OVC and associated winning sort key value to be compressed and written into a sorted run in the disk buffer 114.

In order to provide such compression (and associated decompression), the compression manager 102 is illustrated as including a number of components and/or modules. It will be appreciated that such components/modules are provided for ease of illustration and explanation, and are not considered limiting with respect to a number of components/modules required to implement the compression manager 102. For example, a single component of the compression manager 102 in FIG. 1 may be implemented as two or more separate components in various example implementations. Conversely, two or more components of the compression manager 102 in FIG. 1 may be implemented as a single component in various example implementations.

For purposes of the example of FIG. 1, the compression manager 102 includes an OVC processor 124. The OVC processor 124 may be configured to receive successive winning OVCs of instances of the merge bracket 125. Referring back to the simplified example, above, the OVC processor 124 may thus initially receive, following completion of a first instance of the merge bracket 125, an OVC representing a sort key value of 1, along with key location information enabling retrieval of the byte-level representation of the sort key value of 1. Then, following completion of a second instance of the merge bracket 125, an OVC representing a sort key value of 2 may be received by the OVC processor 124, along with key location information enabling retrieval of the byte-level representation of the corresponding sort key value of 2. Such processing may continue following execution of each instance of the merge bracket 125, until all winning OVCs and associated sort keys have been successfully merged.

Each time an OVC is received, the OVC processor 124 may determine a number of bytes (or other quantify of information) that may be removed from the corresponding sort key value. For example, in various examples below provided with respect to FIGS. 3-6, a sort key value of 000000000003 in hexadecimal notation (in which 2 digits can be represented using 1 byte) may be compared to an initial 0 value expressed as 000000000000. A corresponding OVC (in this example, a codeword) may be calculated as 0006FFFC, in which the portion 0006 enables determination of a number of equal bytes (i.e., 4 bytes, corresponding to the 8 duplicative digits 00000000), while the portion FFFC represents an unequal portion 0003. More specifically, in the example, the value FFFC represents an inverse or ones complement of 0003 in hexadecimal notation, for reasons related to specific techniques for updating the merge bracket 125 in some known techniques used in the z/Architecture® contexts referenced above, which are not described here in detail.

Use of the OVC processor 124 in processing and parsing a received OVC rely on corresponding techniques used to construct and represent the OVC being processed/parsed. Put another way, different types of OVCs may be processed/ parsed differently by the OVC processor to determine a reduction value of duplicative portions of a sort key value that may be omitted to thereby compress the sort key value and reduce a quantity of information required to be stored using the disk buffer 114. Some specific examples of OVC construction techniques that may be used by the OVC processor 124 are provided in the examples of FIGS. 3-6, below, in which OVCs are calculated as codewords in the z/Architecture® contexts referenced above.

For purposes of FIG. 1, it is sufficient to understand that the OVC processor 124 is configured to receive a winning OVC and associated sort key value, and to leverage construction techniques used to construct the winning OVC to deduce a number of equal (and therefore redundant) bytes of the two sort key values compared by the winning OVC. Then, a key reducer 126 may be configured to modify the winning sort key represented by the winning OVC, e.g., by removing the equal bytes identified by the OVC processor 124.

A reduction value manager 128 may be configured to determine, from the OVC processor 124, the reduction value corresponding to the number of equal bytes removed by the key reducer 126. For example, in the example above, the sort key 000000000003 has 8 digits and 4 bytes removed (i.e., 00000000) and deleted by the key reducer 126, so that the reduction value is 4 bytes, while the retained key value is 0003. Therefore, a final compressed key value may be determined to be 04|0003, which may be stored in compressed keys 130 in the disk buffer 114.

Consequently, it is conceptually straightforward for a key regenerator 132 to reconstruct or decompress the original sort key value from the compressed key value of 04|0003.

For example, the value 04 in the example indicates 4 bytes or 8 digits of zero value (i.e., 00000000), to which the retained key value of 0003 may be appended to recover the original sort key value of 000000000003. The original, corresponding OVC may also be recovered using an OVC regenerator, which is configured to implement inverse operations of the OVC construction techniques used by the OVC processor 124 during compression of the sort key value to recover a corresponding OVC value.

In the simple example above, which is included in further examples of FIG. 3, below, the redundant digits 00000000 that are removed for compression purposes are all zero values, because the key value 000000000003 is compared to the initial value of 000000000000. As key values increase within the sorted sequences 116, 118, 120, each OVC for a key value is obtained through comparison with a preceding key value, so that, as key values increase, the redundant portions thereof eventually are not zero values, but may be any stored value. Thus, as the compressed keys 130 are read into (or read out of) the disk buffer 114 by the compression manager 102 in sequential order, sizes of the redundant key portions removed (or restored) may be determined by the reduction value manager 128, while values of the redundant key portions may be determined by the relative order of consecutive key values.

In conventional systems, as described above, each winning sort key value of each instance of the merge bracket 125 is associated with a corresponding OVC, and the OVC is discarded as having served its purposes in facilitating sorting/merging operations of the sort/merge manager 104. In the system of FIG. 1, in contrast, the compression manager 102 utilizes the OVC of each winning sort key value of each executed instance of the merge bracket 125 to provide the compressed keys 130, thereby enabling enhanced and improved use of the disk buffer 114, including reducing an elapsed time required by the sort/merge manager 104 to merge the sorted sequences 116, 118, 120, and thereby reducing downtimes experienced by any application that utilized a resulting merged sequence of sorted key values.

Various additional or alternative examples and/or associated details are provided below, or would be apparent. For example, described techniques utilize the fact that a winning OVC of a given instance of the merge bracket 125 will be calculated relative to a preceding winning OVC of the immediately preceding instance of the merge bracket, for which a proof is provided below.

A degree of compression provided for the compressed keys 130 will vary based on various factors. For example, a given pair of keys may have no or few redundant portions, and thus may receive little or no compression, while another pair of keys may more redundant portions, and thus may receive significant compression. In some cases, a successive pair of keys may be duplicative, and significant compression may be achieved by providing an indication of key duplication. In all or almost all cases, however, described techniques provide meaningful data compression and associated reductions in elapsed time, with little or no impact on use of associated processing and memory resources.

FIG. 2 is a flowchart illustrating example operations of the system of FIG. 1. In the example of FIG. 2, operations 202-210 are illustrated as separate, sequential operations. In various implementations, the operations 202-210 may include sub-operations, may be performed in a different order, may include alternative or additional operations, or may omit one or more operations. Further, in all such implementations, included operations may be performed in an iterative, looped, nested, or branched fashion.

In FIG. 2, a winning offset code value is received from a merge bracket having a plurality of nodes, the merge bracket being used to merge a plurality of sorted sequences of sort keys by comparing pairs of the sort keys until a winning sort key is determined, wherein the sort keys are represented by corresponding offset code values determined from relative values of pairs of sort keys, and the winning offset code value represents the winning sort key of the merge bracket (202). For example, as in FIG. 1, the OVC processor 124 of the compression manager 102 may receive a first winning OVC from the node 122, representing a first winning sort key. For example, in the example above, and continued in FIG. 3, below, a first winning sort key may be 000000000003, with a corresponding OVC value of 0006FFFC.

From the winning offset code value, a removed portion of the winning sort key to remove may be determined (204). For example, the key reducer 126 may analyze the winning OVC to determine a number of digits/bytes to remove 00000000 from the winning sort key 000000000003, leaving 0003. Put another way, information regarding a number of digits/bytes in the winning sort key that are duplicative of corresponding digits/bytes of a compared sort key used to calculate the OVC (e.g., the compared value is the initial zero value 000000000000 in the example) may be embedded in the OVC.

Specifically, in the example, the OVC 0006FFFC includes a first portion 0006 that includes information characterizing the number of duplicative digits/bytes (less 2, as described herein), and a second portion FFFC that represents the non-duplicative portion of the compared sort key (that is, the non-duplicative portion in the example is 0003, represented in the OVC by its inverse or ones complement FFFC in hexadecimal format). Even more specifically, the first portion 0006 represents a number of duplicative bytes when the two relevant values (000000000000 and 000000000003) are compared, two bytes (four digits) at a time, plus two. That is, when compared two bytes at a time, there are four total bytes (00000000) that are duplicative.

For purposes of FIG. 2, the inclusion of the additional value of 2 in the first portion 0006 of the OVC should be understood to be representative of various aspects or procedures associated with a particular technique for formation of OVC values, and is not required or limiting with respect to other techniques for forming OVC value that may be used. Instead, the inclusion of the additional value of 2 merely provides an example of the type of processing that may be implemented by the OVC processor 124 in processing OVC values. In particular, in the example, the OVC processor 124 may process the OVC of the winning node 122 by removing the second portion FFFC and processing the first portion 0006 by subtracting 2 (i.e., the additional value of 2 just discussed), leaving a value of 4. The value of 4 thus indicates the number of bytes of the sort key 000000000003 that are duplicative, so that the 4 bytes or 8 digits of 00000000 are indicated as being duplicative, which may then be removed by the key reducer 126.

A reduction value characterizing a size of the removed portion may be determined (206). That is, the reduction value represents a number of bytes removed by the key reducer 126. In the preceding example, the reduction value was 4 bytes, as 4 bytes or 8 digits were removed from the sort key 000000000003.

From the winning offset code value, a retained portion of the winning sort key to retain may be determined (208). For example, as just noted, the key reducer 126 may remove the initial 8 digits/4 bytes 00000000 of the sort key 000000000003, and retain the remaining 4 digits/2 bytes 0003.

The reduction value and the retained portion of the winning sort key may then be stored (210). For example, the reduction value and the retained portion of the winning sort key may be stored as a compressed key of the compressed keys within the disk buffer 114.

Figure 3:
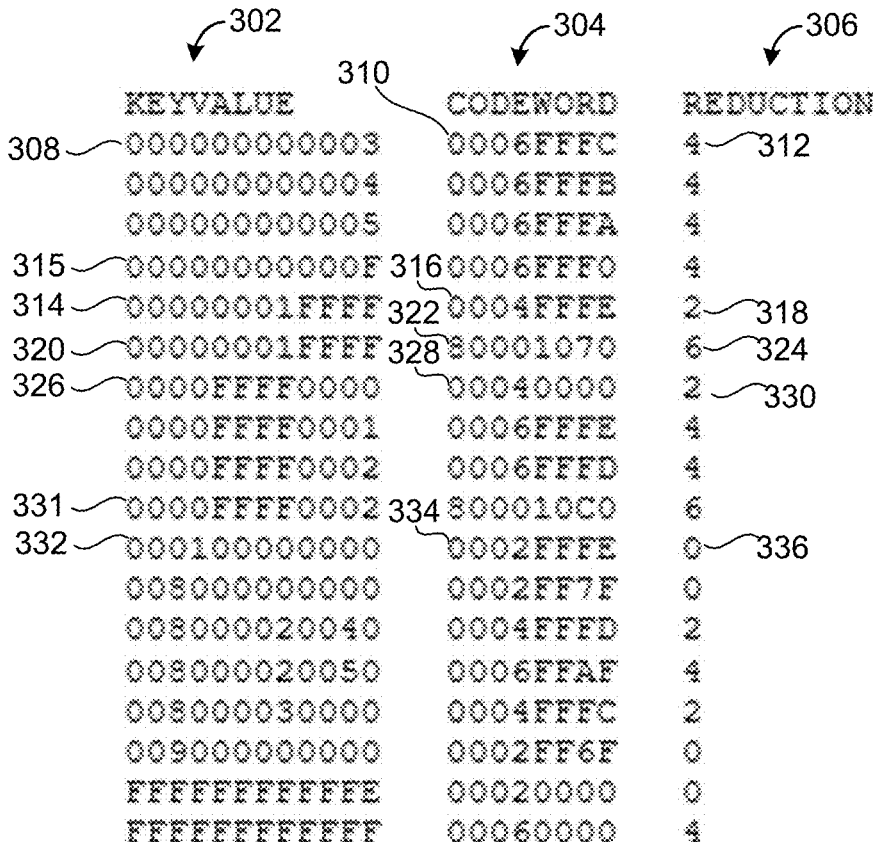
FIG. 3 illustrates example sort keys that may be compressed using the system of FIG. 1.

FIG. 3 illustrates example sort keys that may be compressed using the system of FIG. 1. In FIG. 3, a key value column 302 includes example sort keys, a codeword column 304 includes corresponding example offset code values in the form of codewords, and a reduction column 306 includes reduction values for corresponding sort key values and their respective codewords.

In FIG. 3, and in following figures, examples of OCVs are provided as codewords, which are the specific type of OCV used in the z/Architecture® referenced above. For example, such codewords may be formed using the CFC instruction described above, and corresponding merge brackets may be updated using the UPC command referenced above.

Specifically, a sort key 308 is illustrated as the example sort key 000000000003 discussed above. Although not shown in FIG. 3, an initialization zero value sort key 000000000000 may be used by the CFC instruction, or similar, together with the sort key 308 to generate a corresponding codeword 310, shown as 0006FFFC. For example, as described herein, the codeword 310 may be calculated by comparing the sort key 308 to the zero value sort key, two bytes (four digits) at a time. For the example, there are two 2 byte sequences that are identical (i.e., all zeros in the example), for a total of four identical (zero) bytes, or 8 digits of zeros.

An additional value of 2 is added to the 4 bytes of identical values, to obtain a value of 0006 for the first half of the codeword 310. As referenced above, and described in more detail, below, the additional value of 2 is added as part of a solution for situations in which two different sort key values map to the same codeword. Also particular to codeword formation, remaining non-identical 2 byte portions of the sort key 308 (i.e., 0003) may be inverted in hexadecimal format (put another way, the ones complement of 0003 may be calculated) to obtain a remainder of the codeword 310 as FFFC.

Thus, a reduction value 312 of 4 is obtained for the example sort key 308 and corresponding codeword 310, representing the 4 identical bytes (in this case, four bytes of zero values 00000000) determined during formation of the codeword 310. Given knowledge of the rules/algorithm for calculating the codeword (e.g., the CFC instruction), the reduction value 312 may be calculated directly from the codeword 310 by simply taking the first half of the codeword (0006) and subtracting 2. More generally, with respect to FIG. 1, The OVC processor 124 may be configured to calculate a reduction value based on any underlying algorithm for calculating a given OVC (e.g., codeword) in the first place.

To provide additional examples, a sort key 314 is illustrated as 00000001FFFF. In this case, comparing the sort key 314 to a preceding sort key 315 two bytes at a time yields 2 bytes of identical digits (0000), while 4 bytes (0001FFFF) are non-identical. Therefore, adding 2 in accordance with the codeword algorithm of the CFC, a codeword 316 includes a value 0004, along with a value FFFE that is a one complement for the non-identical portion of the sort key 314. A reduction value 318 is equal to 2, which is the amount of identical bytes and which can be obtained by subtracting 2 from the portion 0004 of the codeword 316.

A sort key 320 is identical in value to preceding sort key 314. In this case, a codeword 322 takes a special value 80001070 indicating and identifying the duplication. A reduction value 324 of 6 indicates that all 6 bytes (12 digits) are duplicative and may be reduced for purposes of compression.

A sort key 326 is illustrated as 0000FFFF0000. Comparing the sort key 326 to the preceding sort key 320 two bytes at a time yields 2 bytes of identical digits (0000), while 4 bytes (FFFF0000) are non-identical. Therefore, adding 2 in accordance with the codeword algorithm of the CFC, a codeword 328 includes a value 0004, along with a value 0000 that is a one complement for the non-identical portion of the sort key 314. A reduction value 330 is equal to 2, which is the amount of identical bytes and which can be obtained by subtracting 2 from the portion 0004 of the codeword 328.

In a final example from FIG. 3, a sort key 332 is compared to a preceding sort key 331. In this example, none of the compared two byte portions are identical. Therefore, a codeword 334 includes a first portion 0002 that includes only the value 2 added in conjunction with the CFC, and a reduction value 336 is zero.

Figure 4:
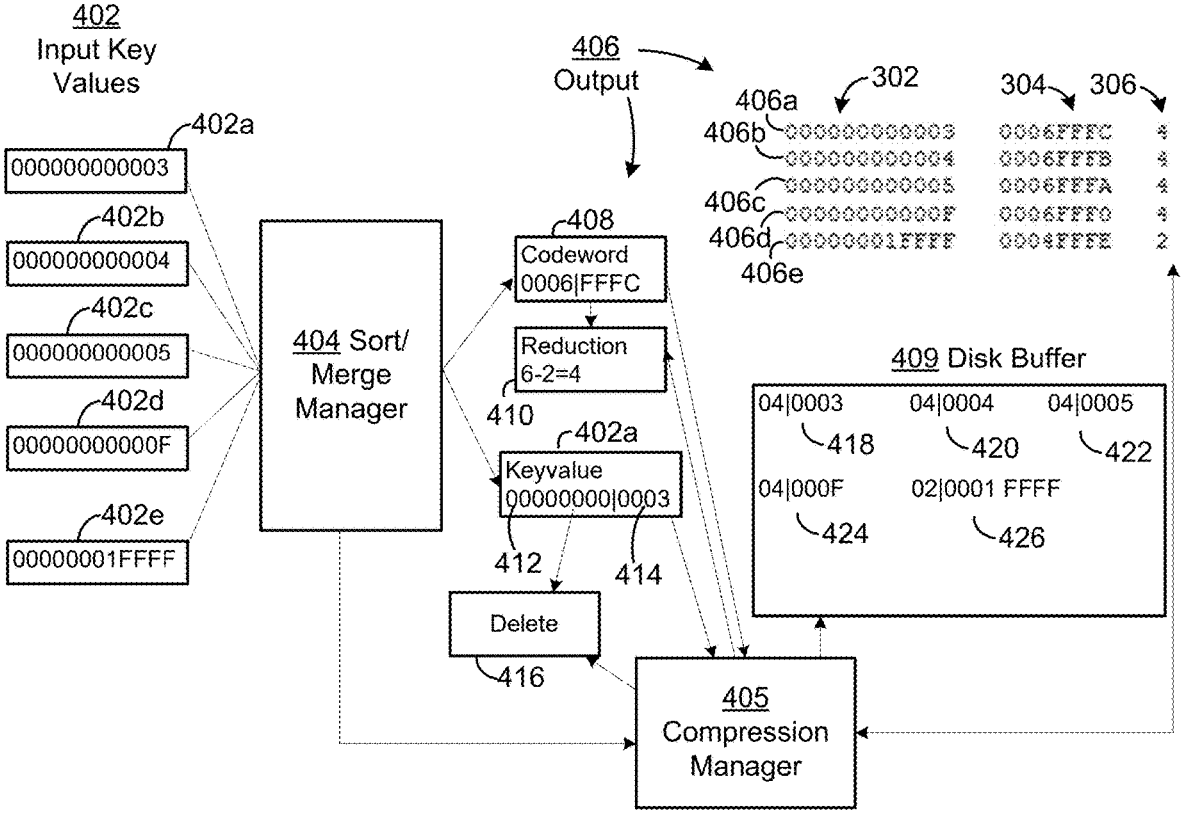
FIG. 4 is a block diagram of an example implementation of the system of FIG. 1, using examples of FIG. 3.

FIG. 4 is a block diagram of an example implementation of the system of FIG. 1, using examples of FIG. 3. In FIG. 4, input key values 402 includes the first five sort keys of FIG. 3, illustrated in FIG. 4 as sort key 402a, 402b, 402c, 402d, and 402d. As explained with respect to FIG. 1, a sort/merge manager 404 may be configured to process the input key values 402 and output sorted/merged key values 402a-402e, in sequence and with their respective codewords, for further processing by a compression manager 405. The compression manager 405 is configured to input the sorted key values and their respective codewords, and provide output a compressed key value and associated reduction value.

Thus, in FIG. 4, the output 406 includes the first five lines of the columns 302, 304, 306 of FIG. 3, as shown, labeled in FIG. 4 as outputs 406a, 406b, 406c, 406d, and 406e. FIG. 4 further illustrates the specific example of the output line 406a, consistent with discussions of the same example as provided above.

That is, the input key value 402a is output from the sort/merge manager 404 with its codeword 408, which are both then processed by the compression manager 405. As described with respect to FIG. 3, a first portion 0006 of the codeword 408 is reduced by 2 to leave a reduction value of 4. Thus, the input sort key value 402a is divided into a first portion 00000000 that is 4 bytes that are identical to a preceding sort key (the zero value or initialization value in this example), and a portion 414 of 0003. Therefore, the compression manager 405 proceeds to delete (416) the identical portion 412, while including the remaining portion 414 and the reduction value of 4 in the disk buffer 409 as compressed key value 418.

Similar processing may be performed to provide a compressed key value 420 for output line 406b, showing a reduction value of 4 and a non-identical portion of 0004. Similar processing may be performed on remaining lines 406c, 406d, and 406e of the example, to obtain, respectively, compressed key values 422, 424, and 426.

As referenced above, not all key values can be compressed by the same amount(s), or at all. For example, compressed key value 426 has a reduction value of 02 02 (2 bytes), and a non-duplicative portion of 0001 FFFF (4 bytes).

FIG. 4 illustrates the first five compressed key values 418, 420, 422, 424, 426. An entirety of compressed key values for the examples of FIG. 3 are provided below in Table 1.

TABLE 1

| Key Value | Compressed Key Value |
|---|---|
| 000000000003 | 04 0003 |
| 000000000004 | 04 0004 |
| 000000000005 | 04 0005 |
| 00000000000F | 04 000F |
| 00000001FFFF | 02 0001 FFFF |
| 00000001FFFF | FF |
| 0000FFFF0000 | 02 FFFF 0000 |
| 0000FFFF0001 | 04 0001 |
| 0000FFFF0002 | 04 0002 |
| 0000FFFF0002 | FF |
| 000100000000 | 00 0001 0000 0000 |
| 008000000000 | 00 0080 0000 0000 |
| 008000020040 | 02 0002 0040 |
| 008000020050 | 04 0050 |
| 008000030000 | 02 0003 0000 |
| 009000000000 | 00 0090 0000 0000 |
| FFFFFFFFFFFE | 00 FFFF FFFF FFFE |
| FFFFFFFFFFFF | 04 FFFF |

In the examples of Table 1, keys are 6 bytes and there are 18 keys, for a total key size of 108 bytes. In the compressed keys of Table 1, a total of 52 bytes of data is removed from the key values, and 18 bytes of control byte data (1 byte each in the example) is added. Therefore, a compression percentage of the example is 1–(74/108) or 31% compressed.

As just noted, all of the reduction values of Table 1 may be expressed using a single control byte. In other cases, such as when key values are longer and/or reduction values are larger, it may be necessary to dedicate more memory to storing more data to represent the reduction values using one or more control bytes. For example, two bytes may be needed to represent a quantity of duplicative information deleted from a key value being compressed. Additional details and examples are provided below that describe techniques for determining a value of a control byte that is needed/used.

As described above with respect to FIGS. 1-4, a merge bracket or tournament tree may be used to execute a sort/merge operation of separate sequences of sort key values. The merge bracket may be used to store codewords representing, and enabling comparisons of, corresponding keys. The keys, codewords, and the merge bracket itself may be stored in cache(s) or main memory. Each instance of the merge bracket produces a winning codeword and a pointer to the corresponding winning key in memory.

In described techniques, the winning codeword is analyzed and used to truncate the winning key in memory and transfer remaining bytes of the winning key to a disk buffer or other secondary memory, e.g., for eventual writing to disk with an associated reduction value/control byte, to thereby provide compressed key values. The compressed key values may later be decompressed to recover the full sort key value, and associated codeword if desired. For example, in some decompression scenarios, compressed key values from a disk buffer may be read into memory for further sorting/merging with other sorted sequences, in which case each compressed key would be expanded before participating in the corresponding merge bracket/tournament tree.

Figure 5:
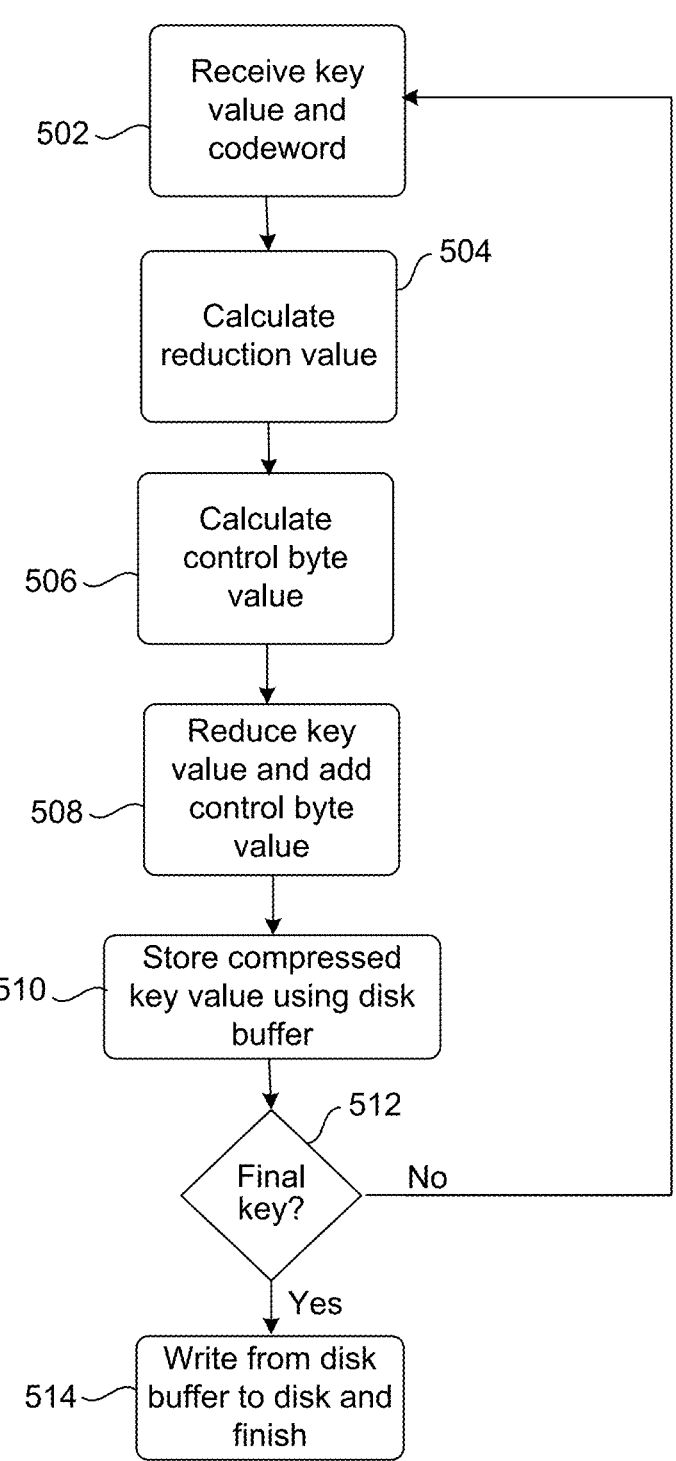
FIG. 5 is a flowchart illustrating example compression operations of the system of FIG. 1.

FIG. 5 is a flowchart illustrating example compression operations of the system of FIG. 1. In FIG. 5, a key value and codeword are received that correspond to a winning instance of a merge bracket (502), as described above. For purposes of FIG. 5, and as also described above, it is assumed that the codeword was generated with the CFC and the UPT instruction was used to traverse the merge bracket and produce the winning instance(s) by comparing codewords stored in the nodes of the bracket/tree.

The examples above generally reference a 4 byte codeword, each of which includes two parts: first, the number of equal bytes when two keys are compared two bytes at a time, plus two (which uses two of the four bytes of the codeword); and second, the unequal bytes of the higher of the two keys being compared, inverted (which also uses two of the four bytes of the codeword). When the two keys being compared are equal, the codeword high order bit is set on.

An alternate to the 4-byte codeword is an 8-byte codeword, which may be useful when keys being used are sufficiently long. The only difference is that the bytes are compared 6 bytes at a time as opposed to 2 bytes at a time. In these examples, the first portion of the 8-byte codeword is the number of compared bytes, and uses 2 bytes (the same as the 4-byte codeword). Then, the second portion is 6 bytes and contains the inverse of the bytes that did not compare equal of the high operand. As with the 4-byte codeword, when the two keys being compared are equal, the codeword high order bit is set on.

As referenced above, when a UPT instruction encounters duplicate codewords or a "tie", the traversal process is terminated, and the program then resolves the tie by invoking the CFC instruction for the corresponding key(s), to then advance through the keys to compute yet another codeword followed by a resume of the UPT instruction. Put another way, the resolution of a tie is to recompute the codeword from the point of the last comparison by using the first section as an index into the original key.

As also referenced above, described techniques rely on the fact that the codeword received with the winning key value of the merge bracket instance is calculated relative to a preceding codeword and key value received as the winner of the preceding merge bracket instance. This fact enables the described uses of the received codeword, which is typically emitted with a winning key value but thereafter ignored in conventional systems, in compressing the winning key value. That is, as described herein, the first half of the codeword may then be used to reduce the size of the key emitted as the winner relative to an immediately preceding prior winner.

To prove that the codeword of the current winning key value is relative to a prior winning key, it may be considered that when comparing records in the path of the most recent winning key, if the most recent winning key is represented by a codeword resulting from a comparison with the preceding winning key, then all codewords in the update path are with respect to the same winner. Further, the merge bracket or tree is constructed of internal nodes and external nodes, where internal nodes have codewords resulting from loser key comparisons and external nodes having codewords of the actual keys relative to zeros or prior winners. The topmost node of the tree, also referred to as the root, is an internal node and has in it the last loser codeword that participated in producing a prior winner. The new winner must have traversed the root of the tree, and since the root was relative to a prior winner, the new winner must be relative to a prior winner.

Using the above observations, the received codeword may be used to calculate a reduction value of the received key value (504). Specifically, for example, the size of the received winning key value may be reduced by the number of equal bytes (if greater than 0) in the corresponding codeword. That is to say, the first n bytes of the received winning key are equal to the first n bytes of the prior winning key, and establish a reduction value representing a quantity of information that may be deleted or truncated from the winning key value for storage.

Put another way, assuming all keys are primed relative to a key of binary zeroes, the first key emerging from the tree will be relative to binary zeroes. Each subsequent winner key will be relative to its predecessor. The codeword associated with a key value emerging from the tree will be used to generate the reduction value as follows. For a four byte codeword, if the first half of the codeword (first two bytes) is n, and if n is greater than zero, then the reduction is n−2; otherwise, the reduction value is the key length. For an eight byte codeword, if the first two bytes is n, and if n is greater than zero, then the reduction is n−6; otherwise, the reduction value is the key length.

A control byte value may then be calculated for the reduction value (506). That is, a calculated reduction value may be expressed for inclusion in the compressed key value in secondary storage using a control byte. Since the purpose of the compression is to reduce the quantity of data stored in the secondary storage, the quantity of data used to express the reduction value (i.e., the control byte) should be minimized. Put another way, it is desirable to use a minimum number of bytes to construct and store the control byte, in order to conserve space within the secondary storage.

Assuming available sort/merge products operate on keys that may have a maximum length of 4096 bytes, so that one byte is insufficient to describe the reduced length for sufficiently long key values of potential key values. In example embodiments, one byte is used for the control byte when possible (i.e., when associated keys are short enough), and two bytes are used when necessary (when associated keys are longer).

Therefore, a control mechanism to control the optimal generation of control bytes may be implemented as follows. If the control byte value is <128, then the reduction length field is one byte and the control byte may be implemented using one byte. If the current key is equal to the prior key, the control byte is also one byte. Otherwise, the control byte length is 2 bytes with high order bit on and the length of the reduction is obtained by removing the high order bit of the 2-byte binary result and ensuring that the 3 next bits are zero.

Put another way, for a reduction length between 0 and 127, a control byte may be stored in a single byte. For a reduction length exceeding 127, the reduction length can be stored in a maximum of 2 bytes. A special case exists when the reduction length is equal to the key length, meaning a duplicate key value. In these cases, and regardless of the key length, the control byte is one byte and has the value X'FF'=255 decimal.

When the reduction length is >127, two byte control bytes may be constructed as follows. A value X'8nnn' may be used, where nnn is the reduction length and the $1^{st}$ digit of 8 should be ignored when deriving the length. In binary form, the above X'8nnn' can be specified as B'1000 xxxx yyyy zzzz'. Where xxxx is the binary value for the $1^{st}$ n and yyy is the binary value for the $2^{nd}$ n, and zzzz is the binary value for the 3rd n (the $1^{st}$ binary digit is a 1 followed by three 0's).

Thus, if value(byte)<=127 then the control byte is one byte. If value(byte)=255 (x'FF') then the control byte is one byte without any key values following. Otherwise, the control byte is 2 bytes: The $1^{st}$ digit is x'8' or B'1000', and the next 3 digits in hexadecimal are the reduction length value. For example: a reduction length of 128 is encoded as X'8080', a reduction length of 126 is encoded as X'7E', a reduction length of 256 is encoded as X'8100', a reduction length of 0 is encoded as X'00', a reduction length of 1 does not exist because the value must be a multiple of 2 (for the 4 byte codeword) or 6 (for the 8 byte codeword).

Thus, in FIG. 5, equal bytes of successive keys should be eliminated from the result and replaced with control bytes encoding the reduction value(s) representing the number of equal bytes that have been eliminated (508). Then, the compressed key value with the control byte and the non-duplicative key value portion may be stored in a disk buffer (510).

If further keys remain (512), the process may continue (502). Otherwise (512), data from the disk buffer may be written to disk (514). Data could also be written from the disk buffer to disk storage in stages, prior to a final key being reached, and various other types, implementations, or uses of secondary storage may exist, as well.

Figure 6:
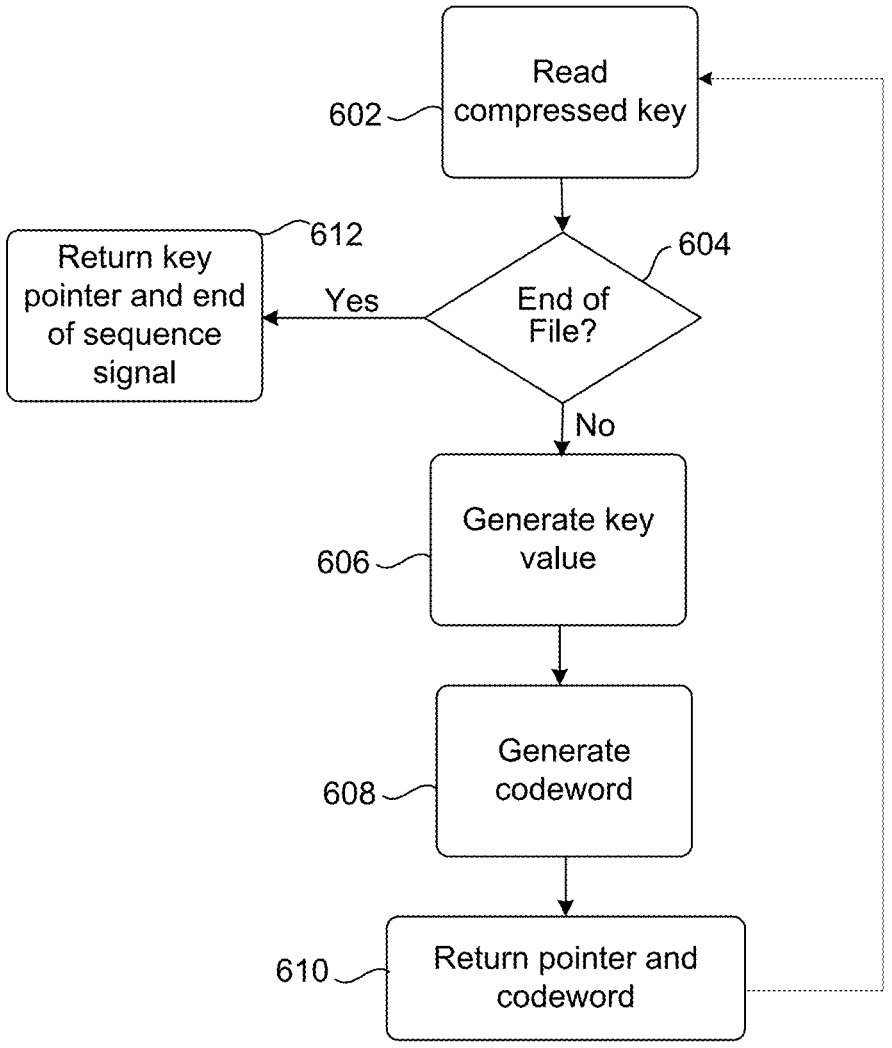
FIG. 6 is a flowchart illustrating more detailed example decompression operations of the system of FIG. 1.

FIG. 6 is a flowchart illustrating more detailed example decompression operations of the system of FIG. 1. For example, during a final merge of all run files being sorted/merged, each run file will be read, and each record will be decoded to generate the nth key as well as the associated nth codeword.

Thus, in FIG. 6, a merge algorithm driving a decompression process will request, for each sequence of compressed keys on disk, a pointer to a key with a corresponding codeword. Therefore, to begin, a compressed key, including a control byte or reduction value and non-duplicative key portion, may be read (602).

As long as an end of file (or end of sequence) has not been reached (604), a next key value may be generated (606). For example, as described in more detail, below, it may be assumed that the first compressed key may be the closest in value to the initialization zero value. Therefore, when regenerating the first key value, the reduction value may be expressed as corresponding zeros in the regenerated key value. In subsequent iterations, the duplicated key value portions being regenerated will eventually not be zero values as the key values increase, but may still be determined from preceding key values at that point in the iteration.

Then, the corresponding codeword may be generated (608). For example, in the case of a 4 byte codeword, a value of 2 may be added to the reduction value (or a value of 6 for an 8 byte codeword). Then, an inverse of a remaining portion of the compressed key may be calculated to determine a remaining portion of the codeword being regenerated.

In more detail, generation of the key value (606) and the codeword (608) may start with a default key of binary zeroes on a first record access (subsequent record access should not modify the last key generated). Then, upon accessing the nth record, a value of the first control byte may be set to X, and if X is less than 128, then the key may be generated by appending the remaining key value of the nth record to the default key at offset=X. Then (assuming a 4 byte codeword), the first half of the codeword may be generated as (X+2), and the $2^{nd}$ half of the codeword may be generated by inverting the first two bytes of the reduced key value contained in the record.

If X=255, then the codeword may be generated as x'80000000'. Otherwise, Consistent with the examples above in FIG. 5, it may be assumed that the control byte comprises two bytes. In these cases, the high order bit may be removed from the first control byte, and the first and second control bytes may be concatenated to form a positive number X. Then, the same procedure described above for X<128 may be followed.

In a specific example, for the case of the compressed key value 418 of FIG. 4 of 04|0003, the preceding technique may be used to recover the original key value of 000000000003 and codeword 0006FFFC. For example, for this example as the first record access, the initialization key of 0000 0000 0000 would be used, with X=4 as the reduction value.

In more detail, and using the preceding notation, decoding the first record containing the compressed key value 418 of 04|0003 may be executed as follows. Starting with an initialization key value of 000000000000 (since the compressed key value 418 is the first record accessed), X is seen to b 4. Since X is less than 128, then the remaining key value 0003 is moved to an offset of four bytes, resulting in a key value of 000000000003.

Then, the first half of the codeword may be reconstructed as X+2=4+2=6. The second half of the codeword can be calculated as NVERT (0003)=FFFC. Therefore, the result is a key value of 0000 0000 0003, and a codeword of 0006FFFC.

In a second example, the compressed key value 420 of 04|0004 may be recovered. Since the previous recovered key value was 000000000003, and X=4 (which is less than 128), then the remaining key value of 0004 can be moved to an offset of four, resulting in Key=0000 0000 0004. The first half of the codeword can be recovered as X+2=4+2=6, and the second half of the codeword can be recovered as INVERT(0004)=FFFB. Therefore, the result is: Key=0000 0000 0004, and codeword=0006FFFB.

Similar operations may be performed for situations with 8 byte codewords. As referenced above, and assuming again that all keys are primed relative to a key of binary zeroes, the first key emerging from the tree will be relative to binary zeroes. Each subsequent winner key will be relative to its predecessor. The codeword associated with a key value emerging from the tree will be used to generate the reduction value as also referenced above, e.g., if the first two bytes are greater than zero then the reduction value is six less than the value of the first two bytes. Otherwise, the reduction value is equivalent to the key length.

Then, during decompression, processing starts with a default key of binary zeroes on first record access, and subsequent record access does not modify the last key generated. When accessing the nth record of a file, X may be set to the value of the first control byte. Then, if X is less than 128, the key may be generated by appending the remaining key value of the nth record to the default key at offset=X. The first half of the codeword may be generated as X+6. The second half of the codeword may be generated as the inversion of the first six bytes of the reduced key value in the record. If X=255, then the codeword x'80000000 00000000' may be generated. Otherwise, as the control byte comprises 2 bytes in the example, the high order bit may be removed from the first control byte, the first and second control bytes may be concatenated to form a positive number X, and the same procedure as if X<128 above may be performed.

Once a key value and associated codeword have been decompressed, they may be returned to the corresponding merge algorithm (610), and the next compressed key may be read (602). This process may continue until an end of file is reached (604). At that point, a key pointer for the final key may be returned, along with an end of sequence signal (612). In a specific, non-limiting example, the end of sequence signal could be a specially constructed codeword, but other end of sequence signals may be used, as well.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

receive a winning offset code value from a merge bracket having a plurality of nodes, the merge bracket being used to merge a plurality of sorted sequences of sort keys by comparing pairs of the sort keys until a winning sort key is determined, wherein the sort keys are represented by corresponding offset code values determined from relative values of pairs of sort keys, and the winning offset code value represents the winning sort key of the merge bracket;

determine, from the winning offset code value, a removed portion of the winning sort key to remove;

determine a reduction value characterizing a size of the removed portion;

determine, from the winning offset code value, a retained portion of the winning sort key to retain; and store the reduction value and the retained portion of the winning sort key.

2. The computer program product of claim 1, wherein the instructions are further configured to cause the at least one computing device to:

determine the removed portion of the winning sort key as being duplicative to a preceding sort key used to form the winning offset code value.

3. The computer program product of claim 2, wherein the preceding sort key is associated with a preceding offset code value of a preceding winning sort key of the merge bracket.

4. The computer program product of claim 1, wherein the winning offset code value is a codeword formed using a compare and form codeword (CFC) instruction.

5. The computer program product of claim 1, wherein the instructions are further configured to cause the at least one computing device to:

represent the reduction value using at least one control byte; and store the at least one control byte and the retained portion of the winning sort key.

6. The computer program product of claim 1, wherein the instructions are further configured to cause the at least one computing device to:

retrieve the reduction value and the retained portion of the winning sort key; and restore the removed portion to the winning sort key from a preceding sort key, based on the reduction value, to thereby reconstruct the winning sort key.

7. The computer program product of claim 6, wherein the instructions are further configured to cause the at least one computing device to:

restore the winning offset code value, based on the reduction value.

8. The computer program product of claim 1, wherein the instructions are further configured to cause the at least one computing device to:

delete the removed portion of the winning sort key.

9. The computer program product of claim 1, wherein the winning offset code value is determined from a comparison of the winning sort key and an initialization sort key having a zero value.

10. The computer program product of claim 1, wherein the instructions are further configured to cause the at least one computing device to:

write the reduction value and the retained portion of the winning sort key to a disk buffer as a compressed key;

continue processing subsequent winning sort keys obtained using the merge bracket until a set of compressed keys is stored using the disk buffer; and write the set of compressed keys to disk memory.

11. A computer-implemented method, the method comprising:

receiving a winning offset code value from a merge bracket having a plurality of nodes, the merge bracket being used to merge a plurality of sorted sequences of sort keys by comparing pairs of the sort keys until a winning sort key is determined, wherein the sort keys are represented by corresponding offset code values determined from relative values of pairs of sort keys, and the winning offset code value represents the winning sort key of the merge bracket;

determining, from the winning offset code value, a removed portion of the winning sort key to remove;

determining a reduction value characterizing a size of the removed portion;

determining, from the winning offset code value, a retained portion of the winning sort key to retain; and storing the reduction value and the retained portion of the winning sort key.

12. The computer-implemented method of claim 11, comprising:

determining the removed portion of the winning sort key as being duplicative to a preceding sort key used to form the winning offset code value.

13. The computer-implemented method of claim 12, wherein the preceding sort key is associated with a preceding offset code value of a preceding winning sort key of the merge bracket.

14. The computer-implemented method of claim 11, comprising:

retrieving the reduction value and the retained portion of the winning sort key;

restoring the removed portion to the winning sort key from a preceding sort key, based on the reduction value, to thereby reconstruct the winning sort key; and restoring the winning offset code value, based on the reduction value.

15. The computer-implemented method of claim 11, comprising:

delete the removed portion of the winning sort key.

16. The computer-implemented method of claim 11, wherein the winning offset code value is determined from a comparison of the winning sort key and an initialization sort key having a zero value.

17. A system comprising:

at least one memory including instructions; and at least one processor that is operably coupled to the at least one memory and that is arranged and configured to execute instructions that, when executed, cause the at least one processor to:

receive a winning offset code value from a merge bracket having a plurality of nodes, the merge bracket being used to merge a plurality of sorted sequences of sort keys by comparing pairs of the sort keys until a winning sort key is determined, wherein the sort keys are represented by corresponding offset code values determined from relative values of pairs of sort keys, and the winning offset code value represents the winning sort key of the merge bracket;

determine, from the winning offset code value, a removed portion of the winning sort key to remove;

determine a reduction value characterizing a size of the removed portion;

determine, from the winning offset code value, a retained portion of the winning sort key to retain; and store the reduction value and the retained portion of the winning sort key.

18. The system of claim 17, wherein the instructions are further configured to cause the at least one processor to:

determine the removed portion of the winning sort key as being duplicative to a preceding sort key used to form the winning offset code value.

19. The system of claim 18, wherein the preceding sort key is associated with a preceding offset code value of a preceding winning sort key of the merge bracket.

20. The system of claim 17, wherein the instructions are further configured to cause the at least one processor to:

retrieve the reduction value and the retained portion of the winning sort key;

restore the removed portion to the winning sort key from a preceding sort key, based on the reduction value, to thereby reconstruct the winning sort key; and restore the winning offset code value, based on the reduction value.

* * * * *